US006997207B2

(12) United States Patent
McKesson

(10) Patent No.: US 6,997,207 B2
(45) Date of Patent: Feb. 14, 2006

(54) WATER-HEATER PAN

(76) Inventor: William S. McKesson, 1032 Rig St., Walled Lake, MI (US) 48390

( * ) Notice: Subject to any disclaimer, the term of this patent is extended or adjusted under 35 U.S.C. 154(b) by 0 days.

(21) Appl. No.: 10/980,028

(22) Filed: Nov. 3, 2004

(65) Prior Publication Data

US 2005/0098214 A1    May 12, 2005

Related U.S. Application Data

(60) Provisional application No. 60/519,233, filed on Nov. 12, 2003.

(51) Int. Cl.
*E03B 1/00* (2006.01)

(52) U.S. Cl. .................. 137/312; 137/362; 220/571; 222/108

(58) Field of Classification Search ........... 137/312, 137/362; 220/571; 222/108, 109
See application file for complete search history.

(56) References Cited

U.S. PATENT DOCUMENTS

| | | | |
|---|---|---|---|
| 2,130,930 A | 9/1938 | Rose ........................... 62/31 |
| 2,328,245 A | 8/1943 | Yavitch ....................... 122/13 |
| 3,096,781 A | 7/1963 | Roidt ......................... 137/314 |
| 3,163,159 A | 12/1964 | Buehl et al. ................. 126/363 |
| 3,519,233 A | 7/1970 | Logsdon ..................... 248/146 |
| 4,765,360 A | 8/1988 | Baird ......................... 137/312 |
| 4,903,723 A | 2/1990 | Sublett ....................... 137/312 |
| 5,099,873 A | 3/1992 | Sanchez ..................... 137/312 |
| D337,154 S | 7/1993 | Simpson .................... D23/270 |
| 5,437,303 A | 8/1995 | Johnson ...................... 137/312 |
| 5,452,739 A | 9/1995 | Mustee et al. .............. 137/312 |
| 5,645,103 A | 7/1997 | Whittaker ................... 137/312 |
| D388,566 S | 12/1997 | Reid et al. ................... D32/25 |
| 5,836,554 A | 11/1998 | Lesage ....................... 248/152 |
| 6,079,587 A * | 6/2000 | Vogt ........................... 220/571 |
| 6,116,266 A * | 9/2000 | Dickison et al. ............ 137/312 |
| D434,125 S | 11/2000 | Remeyer ..................... D23/322 |
| 6,216,990 B1 * | 4/2001 | Harrison ..................... 248/146 |
| D441,855 S | 5/2001 | Fine .......................... D23/322 |
| 6,276,309 B1 * | 8/2001 | Zeek .......................... 122/504 |

* cited by examiner

Primary Examiner—Kevin Lee
(74) Attorney, Agent, or Firm—Bliss McGlynn, P.C.

(57) ABSTRACT

A water-heater pan includes a bottom wall for receiving the bottom of a water heater. The bottom wall defines a relatively narrow, arcuate flow receptacle extending continuously outwardly from a portion of the perimeter of the bottom wall. The flow receptacle defines a floor-drain outlet disposed completely through an area of the bottom wall. A continuous side wall extends integrally upwardly and divergently from the entire perimeter of the bottom wall.

20 Claims, 2 Drawing Sheets

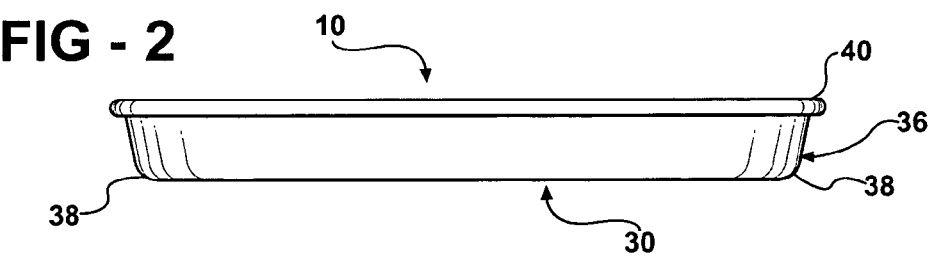
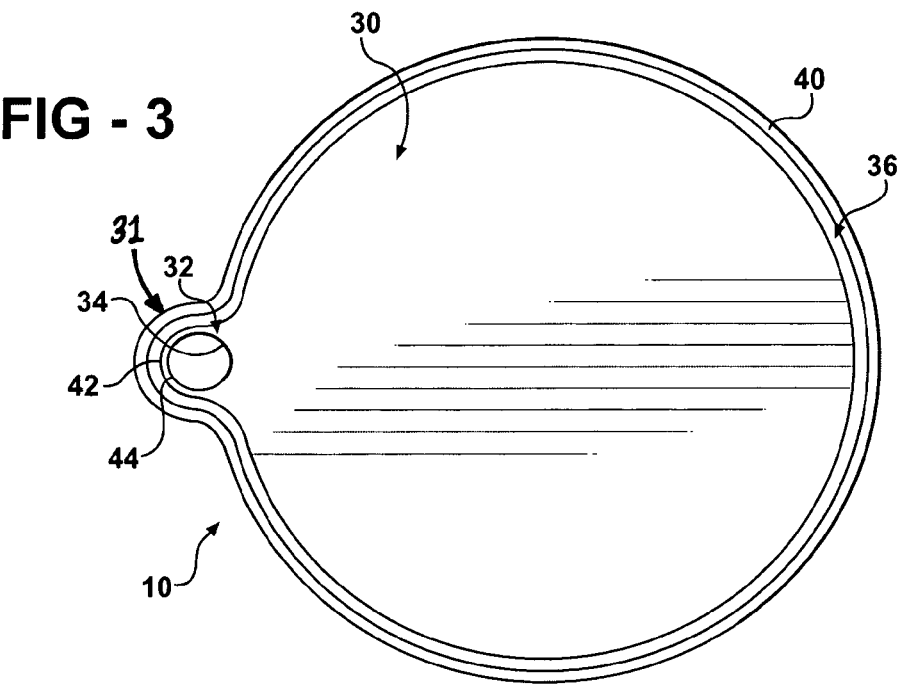
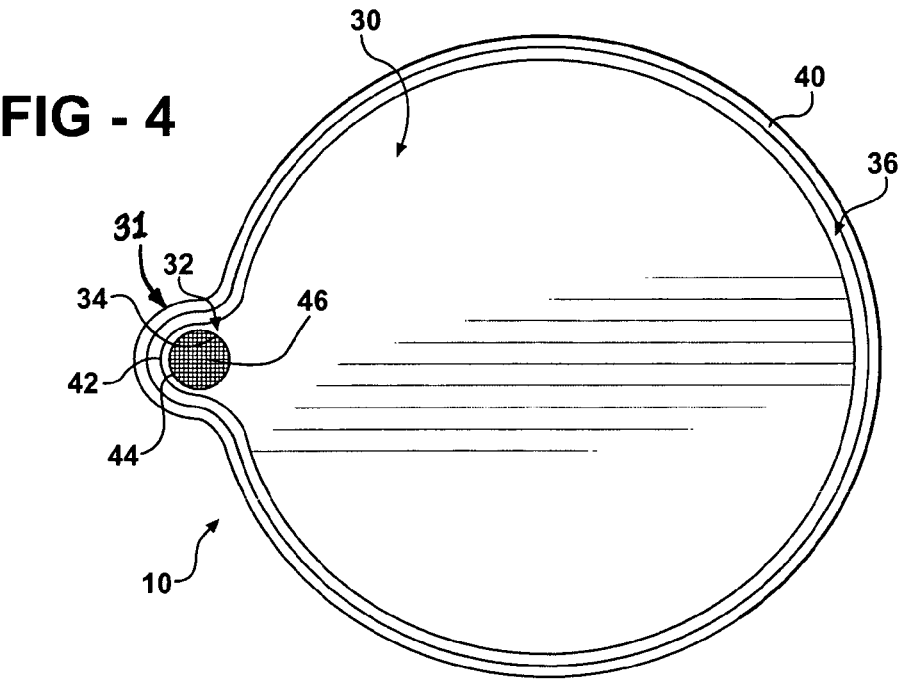

WATER-HEATER PAN

This application claims the benefit of U.S. Provisional Application No. 60/519,233, filed Nov. 12, 2003.

BACKGROUND OF THE INVENTION

1. Field of the Invention

The present invention relates, generally, to a water-heater pan and, more particularly, to a water-heater pan having a bottom outlet-drain.

2. Description of the Related Art

A water heater of the type found, for example, in a garage, basement, or utility room of a residential building generally includes a cylindrical body that houses a reservoir or water tank. Legs can be used to support the body in spaced relation to a floor of the building. A water heater of this type also generally includes cold-and-hot-water connections and a pressure, temperature, or other relief valve extending from the body.

The relief valve must typically discharge water from the water tank, for instance, into a drainage system associated with the building for disposal of the water. As such, a drain is usually installed in a floor of the building and into which the relief valve can discharge the water. More specifically, discharge plumbing extends from the outlet of the relief valve to the floor drain. Some building codes, in fact, specify that the discharge plumbing must be routed to the floor drain.

In addition to the water heater, other appliances, such as an air-conditioning unit, may also be found in the utility room, for example. Similar to the case of the water heater, a condensation line extends from the air-conditioning unit to a floor drain to accept discharge from the unit. Again like in the case of the water heater, some building codes, in fact, specify that the condensation line must also be routed to a floor drain. In a multi-story residential building, such as an apartment building, both a water heater and an air-conditioning unit are generally installed in each dwelling of each story of the building.

As a precautionary measure, some building codes even require that the water heater be placed in a pan, especially in the case of a multi-story residential building. The pan is designed for receiving water and other discharge leaking from the water heater and its associated connections. In this way, the pan prevents damage to the area of the floor surrounding the water heater due to standing water caused by catastrophic failure of the water heater and/or leakage of the relief valve and/or discharge plumbing.

The pan generally includes a substantially round bottom surface for receiving the water heater and a wall extending upwardly from the bottom surface. The pan also includes an outlet or other opening formed on the wall and spaced from the bottom surface of the pan. The outlet, for instance, acts as a means for discharging water that may be collected in the pan. According to current practice in the plumbing industry, no other source of water, such as discharge plumbing from a relief valve or a condensation line from an air-conditioning unit, can be routed to the pan.

Typically, the pan is of sufficient size, shape, and dimension so as to catch all water and other discharge dripping from the water heater and its associated connections and to accommodate tanks of various sizes. Further, the contents of the pan are drained from the outlet of the pan to the suitably located floor drain via waste plumbing. Unfortunately, the location of the outlet on the wall of the pan does not allow for complete drainage of the pan. Mildew is more likely to form within the pan caused by dampness due to incomplete drainage of the pan.

In an apartment building, a pan is generally employed with each water heater of the building to protect against floor damage caused by leakage due to failure of the water heater. Consequently, a floor drain is usually installed in each dwelling of each story of the building and into which the respective pan can discharge its contents through the corresponding waste plumbing. On the other hand, the discharge plumbing and condensation lines are used to route corresponding relief-valve discharge and air-conditioning condensate to the floor drain. The plumbing and lines can take the form of pipes or flexible hosing or tubing, for example.

Considering the potentially high number of dwellings on each of a potentially high number of stories of an apartment building, the increased costs associated with plumbing the drains and discharge, condensation, and waste pipes, for example, and the amount of labor and time for such plumbing can be very substantial, depending upon the number of dwellings within the building. In fact, it is not uncommon for a high-rise apartment building to have hundreds of dwellings. Adding to this the potentially high number of existing and future apartment buildings within a given area, such costs become even more staggering.

Also, extension of discharge, condensation, and waste pipes along a floor to the respective floor drain results in a cluttered utility room. This presents an inconvenience and a potential trip hazard and is aesthetically displeasing. Furthermore, when a drain is installed for these purposes, it is often not watertight with respect to the floor. Therefore, it is not uncommon over a period of time for water damage, like decay, to occur to the floor around the drain. In addition, clothing and other debris disposed on the floor can block or hinder access of the water to the drain to, thereby, create more standing water for damaging the floor around the drain.

Thus, there is a need in the related art for a water-heater pan that prevents damage to the area of a floor surrounding a water heater due to standing water caused by catastrophic failure of the water heater and/or leakage of a relief valve and/or discharge plumbing. There is also a need in the related art for a water-heater pan that allows for complete drainage of the pan and is, thus, more likely to prevent mildew from forming within the pan caused by dampness due to incomplete drainage of the pan.

There is also a need in the related art for decreased costs associated with plumbing drains and discharge, condensation, and waste pipes and the amount of labor and time for such plumbing, especially in multi-story residential dwellings. There is also a need in the related art for plumbing of discharge, condensation, and waste pipes that results in less clutter and is, thus, more convenient, safer, and more aesthetically pleasing than such plumbing of the related art. There is also a need in the related art for watertight installation of drains with respect to corresponding floors such that water damage, like decay, to the floor around the drain is minimized or eliminated. There is also a need in the related art for plumbing of drains such that clothing and other debris disposed on the floor cannot block or hinder access of the water to the respective drains to, thereby, create more standing water for damaging the floor around the drains.

SUMMARY OF THE INVENTION

The present invention overcomes the disadvantages in the related art in a water-heater pan that includes a bottom wall for receiving the bottom of a water heater. The bottom wall forms a protuberance in a portion of the perimeter of the bottom wall and a relatively narrow, arcuate flow receptacle disposed within the protuberance. The flow receptacle defines a floor-drain outlet disposed completely through an area of the bottom wall. A continuous side wall extends integrally upwardly and divergently from the entire perimeter of the bottom wall.

The water-heater pan of the present invention prevents damage to the area of a floor surrounding a water heater. Also, the pan allows for complete drainage of the pan. Furthermore, the pan eliminates the possibility of clothing or other debris blocking or hindering proper drainage of water or other discharge. In addition, the pan facilitates a relatively inexpensive installation of a floor drain. Moreover, the pan can be made from any suitable material, including, but not limited to, plastic, aluminum, or galvanized steel.

With use of the pan, other sources of water and other discharge, such as discharge plumbing from a relief valve or a condensation line from an air-conditioning unit, can be routed to the pan as well. Also, since certain plumbing for discharge, condensation, and waste pipes is eliminated, costs associated with plumbing drains and discharge, condensation, and waste pipes and the amount of labor and time for such plumbing, especially in multi-story residential dwellings, are decreased. Furthermore, plumbing of discharge, condensation, and waste pipes results in less clutter and is, thus, more convenient, safer, and more aesthetically pleasing than such plumbing of the related art. In addition, installation of drains with respect to corresponding floors is watertight. Moreover, drains can be plumbed such that clothing and other debris disposed on the floor cannot block or hinder access of the water to the respective drains.

Other objects, features, and advantages of the present invention will be readily appreciated as the same becomes better understood after reading the subsequent description taken in conjunction with the accompanying drawings.

BRIEF DESCRIPTION OF THE DRAWINGS

FIG. 2 is an elevational side view of the water-heater pan of the present invention;

FIG. 3 is an elevational top view of the water-heater pan of the present invention shown without a strainer; and FIG. 4 is another elevational top view of the water-heater pan of the present invention shown with a strainer.

DETAILED DESCRIPTION OF THE INVENTION

Figure 1:
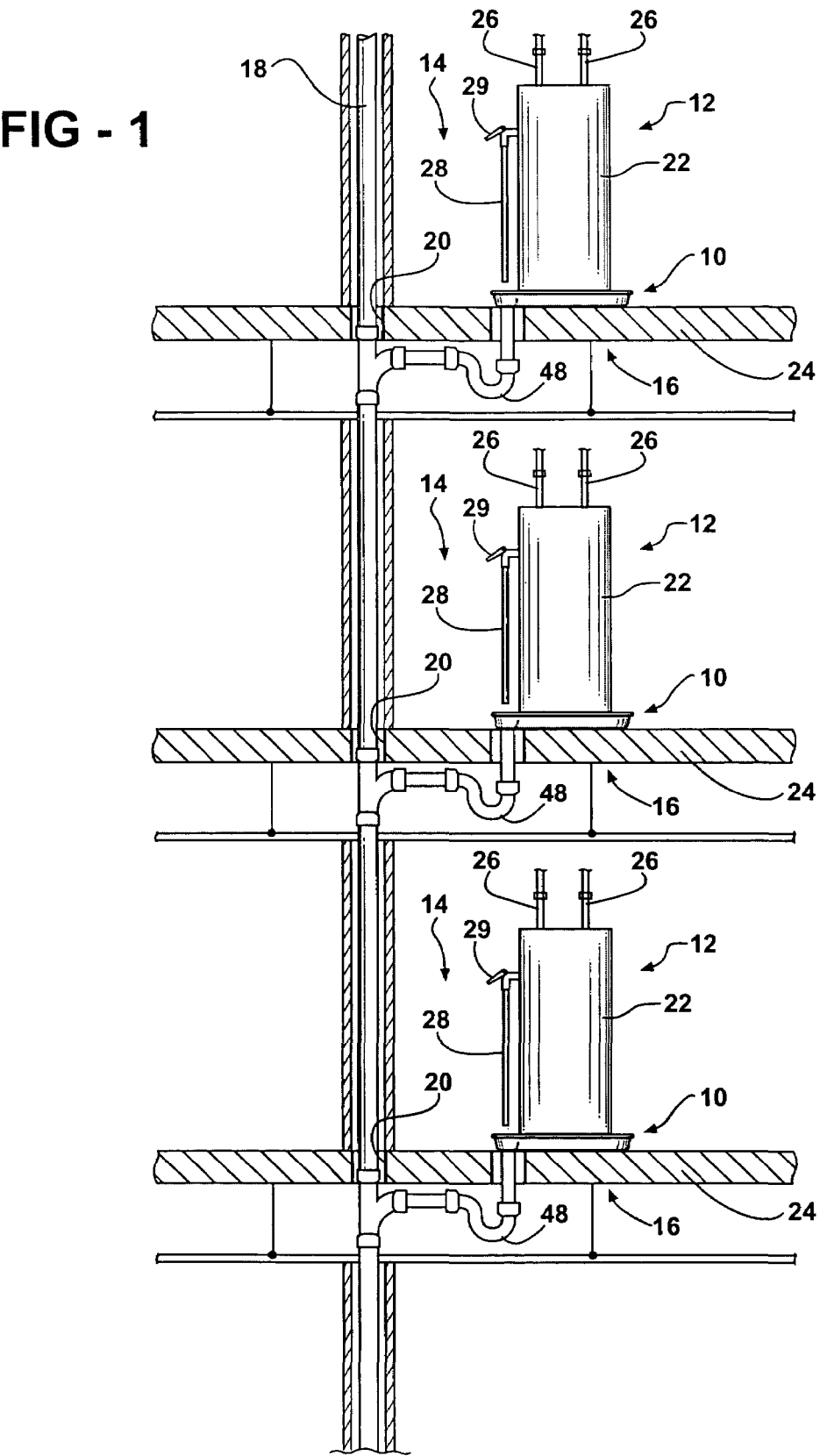
FIG. 1 is a cross-sectional view of consecutive stories of, for example, an apartment building showing the water-heater pan of the present invention used with each of a plurality of water heaters associated with respective dwelling rooms of the building.

Referring now to the figures, where like numerals are used to designate like structure, a water-heater pan of the present invention is generally indicated at 10. The pan 10 is shown in its operative mode in FIG. 1 and per se in FIGS. 2 through 4. In FIG. 1, the pan 10 is supported under each water heater, generally indicated at 12, of a plurality of water heaters 12 associated with respective dwelling rooms, generally indicated at 14, of consecutive stories of, for example, an apartment building. Those having ordinary skill in the related art will appreciate that although the pan 10 can be used with a water heater installed in only a single dwelling or each dwelling of a single-story building, the pan 10 finds special application when used under the circumstances as shown in FIG. 1 and described in detail below.

Referring now to FIG. 1, a water heater 12 is located specifically in a utility room 14, for example, of each dwelling of each of a plurality of consecutive stories of the apartment building. In the building, the water heaters 12 are disposed in a substantially vertical line with respect to each other. Adjacent water heaters 12 are separated by floor/ceiling assemblies, generally indicated at 16, of the respective stories. A pipe 18 extends substantially vertically through a series of substantially aligned holes 20 defined by the respective floor/ceiling assemblies 16.

Still referring to FIG. 1, each water heater 12 includes a cylindrical body 22 that houses a reservoir or water tank. Legs (not shown) can be used to support the body 22 in spaced relation relative to the pan 10. Alternatively, the bottom of the body 22 can be received in the pan 10. In either event, the pan 10 is seated on a suitable supporting surface, such as the floor 24 of the respective utility room 14. The water heater 12 also includes cold-and-hot-water connections 26 extending from the top of the water heater 12. A relief-valve line 28, for example, extends from the side of the water heater 12 for conveying discharge from a relief valve 29, as will be described in detail below.

The pan 10 is designed for receiving water and other discharge leaking from the water heater 12 and its associated connections, including the water connections 26, relief-valve line 28, and relief valve 29. In this way, the pan 10 prevents damage to the area of the floor 24 surrounding the water heater 12 due to standing water caused by catastrophic failure of the water heater 12 and/or leakage of its associated connections 26, 28. As a precautionary measure, some building codes even require that each water heater 12 be placed in a pan 10. The pan 10 is also designed to satisfy the need for reducing plumbing requirements.

In view of this and now referring to FIGS. 2 through 4, the pan 10 generally includes a bottom wall, generally indicated at 30, for receiving the bottom of a water heater 12. The bottom wall 30 forms a protuberance, generally indicated at 31, in portion of the perimeter of the bottom wall and a relatively narrow, arcuate flow receptacle, generally indicated at 32, disposed within the protuberance. The flow receptacle 32 defines a floor-drain outlet 34 disposed completely through an area of the bottom wall 30. A continuous side wall, generally indicated at 36, extends integrally upwardly and divergently from the entire perimeter of the bottom wall 30.

In a preferred embodiment of the pan 10 and as shown in FIGS. 2 through 4, the bottom wall 30 (including the flow receptacle 32, which is described in detail below) is substantially planar and smooth. However, those having ordinary skill in the related art will appreciate that the bottom wall 30 (including the flow receptacle 32) can be non-planar and have any suitable contour and size.

As shown in FIG. 2, the side wall 36 extends upwardly and uniformly from the bottom wall 30 at an angle greater than 90° with respect to the bottom wall 30. This structure facilitates stacking of the pans 10 during shipping or storage pending sale or use. However, those having ordinary skill in the related art will appreciate that the angle may have any suitable measurement. The edge 38 defined by joinder of the bottom wall 30 and the side wall 36 is substantially arcuate and defines a smooth transition between the bottom wall 30 and the side wall 36. The side wall 36 is designed to be spaced, in operation of the pan 10, outwardly about one inch or more from the water heater 12 to provide a compact unit of the pan 10 and water heater 12.

The side wall 36 has a substantially longitudinal circular cross-section and, like the bottom wall 30, is substantially planar and smooth. However, those having ordinary skill in the related art will appreciate that the side wall 36 can have any suitable shape and contour. Similarly, the side wall 36 can have any suitable size.

As also shown in FIG. 2, the side wall 36 defines a substantially uniform, smooth lip 40 located at the upper margin of the side wall 36. The lip 40 curves outwardly with respect to the bottom wall 30 in a substantially hemispherical fashion. This provides structural rigidity to and facilitates stacking of the pans 10. However, those having ordinary skill in the related art will appreciate that the lip 40 may curve in any suitable direction with respect to the bottom wall 30 and have any suitable shape, size, and contour.

In the preferred embodiment shown in FIGS. 3 and 4, the pan 10, in general, and the bottom wall 30, in particular, is substantially pear-shaped. More specifically, the bottom wall 30 is substantially round, and the flow receptacle 32 extends outwardly in a "bell curve" fashion from a portion of the perimeter of the bottom wall 30. The flow receptacle 32 defines an arc 42 represented by the top of the "bell curve." However, it will be appreciated by those having ordinary skill in the related art that the pan 10, in general, and the bottom wall 30 (including the flow receptacle 32), in particular, may have any suitable shape to conform to the shape of a particular water heater 12. It will also be appreciated that the flow receptacle 32 can have any suitable structural relationship with respect to the remainder of the bottom wall 30.

As shown in FIGS. 3 and 4, the floor-drain outlet 34 is substantially circular. The floor-drain outlet 34 is located such that an annular space 44 of the flow receptacle 32 is defined between the perimeter of the floor-drain outlet 34 and the side wall 36. However, those having ordinary skill in the related art will appreciate that the floor-drain outlet 34 may have any suitable size and shape and structural relationship with respect to the remainder of the flow receptacle 32.

As shown in FIG. 4, the pan 10 includes a watertight seal, or strainer 46. The strainer 46 is substantially circular and seated on the flow receptacle 32 such that an arc of the strainer 46 is co-extensive with the arc 42 of the flow receptacle 32. The strainer 46 is operatively secured, such as by adhesion or a retainer clip (not shown), within the floor-drain outlet 34 and extends beyond the bottom wall 30 opposite the side wall 36. The strainer 46 is adapted to be connected with a suitable drain line, as shown in FIG. 1 and described below.

It will be appreciated by those having ordinary skill in the related art that the strainer 46 may have any suitable size, shape, and structure and structural relationship with respect to the flow receptacle 32. It will also be appreciated that the strainer 46 may be operatively secured within the floor-drain outlet 34 by any suitable means, extend for any suitable distance, and be connected with a suitable drain line by any suitable means.

In operation and referring back to FIG. 1, the relief-valve line 28 extends from each of the water heaters 12 to the corresponding pan 10 for discharge of water and other waste directly into the pan 10. At the same time, the pan 10 receives discharge leaking from the water heater 10, including its other associated connections 26. The water and leaking discharge then drain through the floor-drain outlet 34 to a drain line 48 extending in fluid communication with the floor-drain outlet 34. This fluid communication eliminates certain plumbing and, as a result, inconvenience and a potential trip hazard and, in turn, is relatively more aesthetically pleasing. From there, the water and leaking discharge then move through the drain line 48 to the pipe 18. The pipe 18 eventually discharges the water and leaking discharge from all the relief valves 29 and water heaters 12 and their associated connections 28, 26, respectively, to a drainage system associated with the building.

Those having ordinary skill in the related art will appreciate that, although not specifically shown, a pan 10 can be used with a line of another appliance in the same room as the water heater 10. In particular, a condensation line of an air-conditioning unit may also extend from the unit to the pan 10 to accept discharge from the unit. In the same way as just described, the discharge from the unit then drains through the floor-drain outlet 34, the drain line 48, and the pipe 18 to a drainage system associated with the building.

In this way, each pan 10 catches flow from the respective relief valve 29, leaking water heater 12, their associated connections 28, 26, respectively, and air-conditioning unit. Also, the pan 10, having a floor-drain outlet 34 installed within the pan 10, does not require separate plumbing to discharge the water from the relief-valve line 28 or the condensation from the air-conditioning unit. The pan 10 then directs its content with the drain line 48, which extends through the floor 24 and the space defined below the floor 24 of the proximate floor/ceiling assembly 16, to the pipe 18 for discharge or disposal of the content into the drainage system. The drainage system may include the floor 24 of the first story of the apartment building, outside of the apartment building, or an indirect waste receptor. In any event, the fact that no additional plumbing is required to discharge the water or the condensation eliminates inconvenience and a potential trip hazard and, in turn, is relatively more aesthetically pleasing.

The present invention results in a significant reduction in the amount of labor, materials, time, and, thus, expense while improving convenience since installation of discharge pipes, condensation lines, and waste pipes is hereby eliminated. Furthermore, the location of the floor-drain outlet 34 on the bottom wall 30 allows for complete drainage of the pan 10.

In addition, since the only floor-drain outlet 34 is disposed in the pan 10 and watertight, water does not discharge where it can cause structural decay, such as onto the floor/ceiling assemblies 16. Rather, any water is discharged directly into the drain line 48 via the floor-drain outlet 34. Moreover, since no discharge or condensation line extends from the corresponding relief valve 29 or air-conditioning unit along the floor 24, use of the pan 10 saves more space than does use of the known water-heater pan. As such, the room 14 within which the pan 10 is used is clutter-free, has no trip hazards, and is more aesthetically pleasing than a room within which the known water-heater pan is used.

The pan 10 is made from any suitable material, such as, but not limited to, plastic, aluminum, or galvanized steel. The pan 10 is designed to have various sizes to accommodate water heaters 12 having various sizes. Those having ordinary skill in the related art will appreciate that the pan 10 may be of any suitable thickness, depending upon the material of which it is made, and depth beyond the minimum thickness and depth required by code.

The floor-drain outlet 34 can have various designs to accommodate various circumstances. More specifically, the floor-drain outlet 34 can have a shape that is determined by a plumber, for example, under given circumstances.

Preferably, the pan 10 is of a unitary, homogeneous construction, as by molding or extruding the pan 10. As such, the pan 10 is easily fabricated, smooth, and easy to clean and has no unsightly seams or sharp edges or corners exposed when the pan 10 is operatively installed on the floor 24 or other supporting surface.

The water-heater pan 10 prevents damage to the area of a floor 24 surrounding a water heater 12. Also, the pan 10 allows for complete drainage of the pan 10. Furthermore, the pan 10 eliminates the possibility of clothing or other debris blocking or hindering proper drainage of water or other discharge. In addition, the pan 10 facilitates a relatively inexpensive installation of a floor drain. Moreover, the pan 10 can be made from any suitable material, such as, but not limited to, plastic, aluminum, or galvanized steel.

With use of the pan 10, other sources of water and other discharge, such as a discharge pipe 28 from a relief valve 29 or a condensation pipe from an air-conditioning unit, can be routed to the pan 10 as well. Also, costs associated with plumbing drains, discharge pipes 28, and condensation and waste pipes and the amount of labor and time for such plumbing, especially in multi-story residential dwellings, are decreased. Furthermore, elimination of certain plumbing for discharge pipes 28 and condensation and waste pipes results in less clutter and is, thus, more convenient, safer, and more aesthetically pleasing than such arrangements known in the related art. In addition, installation of drains with respect to corresponding floors 24 is watertight. Moreover, drains can be plumbed such that clothing and other debris disposed on the floor 24 cannot block or hinder access of the water to the respective drains.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A water-heater pan comprising:
    a bottom wall for receiving the bottom of a water heater and forming a protuberance in a portion of the perimeter of said bottom wall and a relatively narrow, arcuate flow receptacle disposed within said protuberance, said flow receptacle defining a floor-drain outlet disposed completely through an area of said bottom wall; and
    a continuous side wall extending integrally upwardly and divergently from the entire perimeter of said bottom wall.

2. A water-heater pan as set forth in claim 1, wherein said bottom wall is substantially planar and smooth.

3. A water-heater pan as set forth in claim 1, wherein said side wall extends upwardly from said bottom wall at an angle greater than 90° with respect to said bottom wall.

4. A water-heater pan as set forth in claim 1, wherein said side wall is substantially planar and smooth.

5. A water-heater pan as set forth in claim 1, wherein the entirety of said side wall is substantially uniform.

6. A water-heater pan as set forth in claim 1, wherein the edge defined by joinder of said bottom wall and said side wall is substantially arcuate and defines a smooth transition between said bottom wall and said side wall.

7. A water-heater pan as set forth in claim 1, wherein said side wall defines an upper margin and a lip located at said upper margin of said side wall.

8. A water-heater pan as set forth in claim 7, wherein said lip curves outwardly with respect to said bottom wall in a substantially hemispherical fashion.

9. A water-heater pan as set forth in claim 7, wherein said lip is substantially smooth.

10. A water-heater pan as set forth in claim 7, wherein the entirety of said lip is substantially uniform.

11. A water-heater pan as set forth in claim 1, wherein said bottom wall is substantially pear-shaped.

12. A water-heater pan as set forth in claim 11, wherein said flow receptacle extends outwardly in a bell-curve fashion from a portion of the perimeter of said bottom wall and the remainder of said bottom wall is substantially round.

13. A water-heater pan as set forth in claim 12, wherein said flow receptacle defines an arc represented by the top of said bell curve.

14. A water-heater pan as set forth in claim 1, wherein said floor-drain outlet is substantially circular.

15. A water-heater pan as set forth in claim 1, wherein said floor-drain outlet is located such that an annular space of the flow receptacle is defined between the perimeter of said floor-drain outlet and said side wall.

16. A water-heater pan as set forth in claim 13, wherein said pan further includes a strainer seated on said flow receptacle, operatively secured within said floor-drain outlet, and adapted to be connected in sealed fluid communication directly with a suitable drain line.

17. A water-heater pan as set forth in claim 16, wherein said strainer is substantially circular such that an arc of said strainer is co-extensive with said arc of said flow receptacle.

18. A water-heater pan as set forth in claim 16, wherein said strainer is operatively secured within said floor-drain outlet by adhesion.

19. A water-heater pan as set forth in claim 16, wherein said strainer extends beyond said bottom wall opposite said side wall.

20. A water-heater pan as set forth in claim 1, wherein said pan is made from any of plastic, aluminum, and galvanized steel.

* * * * *

UNITED STATES PATENT AND TRADEMARK OFFICE
CERTIFICATE OF CORRECTION

PATENT NO. : 6,997,207 B2
DATED : February 14, 2006
INVENTOR(S) : McKesson

It is certified that error appears in the above-identified patent and that said Letters Patent is hereby corrected as shown below:

<u>Title page,</u>
Item [57], ABSTRACT, should read:
-- A water-heater pan includes a bottom wall for receiving the bottom of a water heater. The bottom wall forms a protuberance in a portion of the perimeter of the bottom wall and a relatively narrow, arcuate flow receptacle disposed within the protuberance. The flow receptacle defines a floor-drain outlet disposed completely through an area of the bottom wall. A continuous side wall extends integrally upwardly and divergently from the entire perimeter of the bottom wall --.

Signed and Sealed this

Ninth Day of May, 2006

JON W. DUDAS
*Director of the United States Patent and Trademark Office*